United States Patent
Lai et al.

(10) Patent No.: US 8,166,334 B2
(45) Date of Patent: Apr. 24, 2012

(54) REDRIVER WITH TWO REFERENCE CLOCKS AND METHOD OF OPERATION THEREOF

(75) Inventors: Ho M. Lai, Spring, TX (US); Chi K. Sides, Spring, TX (US); Paul V. Brownell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 92 days.

(21) Appl. No.: 12/918,050

(22) PCT Filed: Feb. 20, 2008

(86) PCT No.: PCT/US2008/054399
§ 371 (c)(1),
(2), (4) Date: Aug. 17, 2010

(87) PCT Pub. No.: WO2009/105095
PCT Pub. Date: Aug. 27, 2009

(65) Prior Publication Data
US 2010/0315135 A1    Dec. 16, 2010

(51) Int. Cl.
*G06F 1/00* (2006.01)

(52) U.S. Cl. .................... 713/500; 710/310

(58) Field of Classification Search .......... 713/500–502, 713/600; 375/354, 356; 710/310
See application file for complete search history.

(56) References Cited

U.S. PATENT DOCUMENTS

| | | | |
|---|---|---|---|
| 6,055,645 | A | 4/2000 | Noble |
| 6,079,027 | A | 6/2000 | Lai et al. |
| 6,154,803 | A | 11/2000 | Pontius et al. |
| 6,748,039 | B1 | 6/2004 | Bates |
| 2007/0177701 | A1 | 8/2007 | Thanigasalam |

OTHER PUBLICATIONS

International Search Report and Written Opinion, dated Oct. 24, 2008, 11 pages.

*Primary Examiner* — Clifford Knoll

(57) ABSTRACT

A two reference clock architected redriver includes an inbound elastic buffer and an outbound elastic buffer. Data transmitted to and received from a North Bridge uses a common reference clock architecture. Data transmitted to and received from an external blade uses a separate reference clock architecture. The inbound elastic buffer includes an inbound elastic buffer recovered clock domain, an inbound elastic buffer common reference clock domain, and an inbound decoder/descrambler, an inbound scrambler/encoder, and inbound liner shift registers. The outbound elastic buffer includes an outbound elastic buffer common reference clock domain, an outbound elastic buffer low jitter clock domain, and an outbound decoder/descrambler, an outbound scrambler/encoder, and outbound liner shift register.

20 Claims, 10 Drawing Sheets

REDRIVER WITH TWO REFERENCE CLOCKS AND METHOD OF OPERATION THEREOF

TECHNICAL FIELD

The technical field is timing schemes for electronic assemblies.

BACKGROUND

With some current-server blades, storage capacity is limited. One architecture that can be used to increase the storage capacity of a system with such server blades involves installation of a storage blade in proximity to the server blade. The server blade and the storage blade communicate through an x4 PCI-Express (PCIe) link. However, the backplane used with the blades does not support a common reference clock. Furthermore, because the current x86 clock architecture implements a low cost crystal plus clock generator with multiple output frequencies, the clock source on servers as well as on server blade systems tends to have a large phase jitter. In addition, most chip vendors implement low cost digital CDR (clock-data-recovery) circuitry, which may not work properly in a high phase jitter environment.

Due to the separate reference clock (refclk) used on the current blade architecture, SSC (spread-spectrum-clocking) cannot be supported. Any such attempt to use spread spectrum clocking likely will make those architectures vulnerable to failure.

SUMMARY

What is disclosed is a redriver having two reference clocks. The redriver couples an external component, such as a storage blade to a hub, such as a North-Bridge or Root Complex on a server blade. The redriver includes an inbound elastic buffer that has a separate reference clock for an inbound elastic buffer interface between the redriver and the external component, a common reference clock for an inbound elastic buffer interface between the North-Bridge and the redriver, and an inbound decoder/descrambler, an inbound scrambler/encoder, and inbound linear shift registers. The redriver further includes an outbound elastic buffer that has the separate reference clock for an outbound elastic buffer interface between the redriver and the external component, the common reference clock for an outbound elastic buffer interface between the North-Bridge and the redriver, and an outbound decoder/descrambler, an outbound scrambler/encoder, and outbound linear shift registers. Finally, the redriver includes clock recovery logic coupled an external component side of the redriver and to a North-Bridge side of the redriver.

Also disclosed is a redriver employing multiple, non-common reference clocks. The redriver has an inbound data portion and an outbound data portion. The redriver includes an inbound elastic buffer comprising means for adjusting inbound data to compensate for a non-common reference clock, and an outbound elastic buffer comprising means for adjusting outbound data to compensate for a non-common reference clock. The redriver further includes a common reference clock coupled to a first side of the redriver, a low jitter reference clock coupled to a second side of the redriver, and clock recovery logic coupled to the first and the second sides of the redriver.

DESCRIPTION OF THE DRAWINGS

The detailed description will refer to the following drawings in which like numerals refer to like items and in which.

DETAILED DESCRIPTION

As used herein, a computer system encompasses any number of architectures including, for example, blade server systems, blade storage systems, a notebook computer and its docking station, a PCI-Express expansion system, and any other computing system that may use devices that do not have a common reference clock. Examples of such architectures are provided in FIGS. 4 and 7-9. As used herein, a computer also encompasses a portion, or subset, of components comprising the computer system. As used herein, reference clocks include low-grade system clocks, low jitter clocks, and clocks embedded in data streams. As used herein, signal conditioners include signal amplifiers, redrivers, and similar devices.

The advent of high-speed, serial-differential protocols like PCI-Express operating at high data transfer rates has led to issues of signal integrity in some architectures, particularly in lossy transmission applications. Signal conditioners may be used to adjust and correct for signal level attenuation and noise (jitter) by using equalization and pre-emphasis/de-emphasis techniques, for example, so that the receiving end has the margins needed to deliver low bit error rates with high-speed signal protocols, such as PCI-Express. On such signal conditioner is a redriver.

Spread-spectrum clocking is used in the design of synchronous digital systems, especially those containing microprocessors, to reduce the spectral density of the electromagnetic interference (EMI) that these systems generate. A synchronous digital system is one that is driven by a clock signal that, because of its periodic nature, has an unavoidably narrow frequency spectrum. In fact, a perfect clock signal would have all its energy concentrated at a single frequency and its harmonics, and would therefore radiate energy with an infinite spectral density. Practical synchronous digital systems radiate electromagnetic energy on a number of narrow bands spread over the clock frequency and its harmonics, resulting in a frequency spectrum that, at certain frequencies, can exceed the regulatory limits for electromagnetic interference.

To avoid this EMI emission problem, spread spectrum clocking is used to reshape the system's electromagnetic emissions to comply with the electromagnetic compatibility (EMC) regulations. Spread-spectrum clocking distributes the energy so that it falls into a large number of the receiver's frequency bands, without putting enough energy into any one band to exceed the statutory limits. However, spread-spectrum clocking can create challenges for designers because modifying the system clock runs the risk of the clock/data misalignment.

Figure 2:
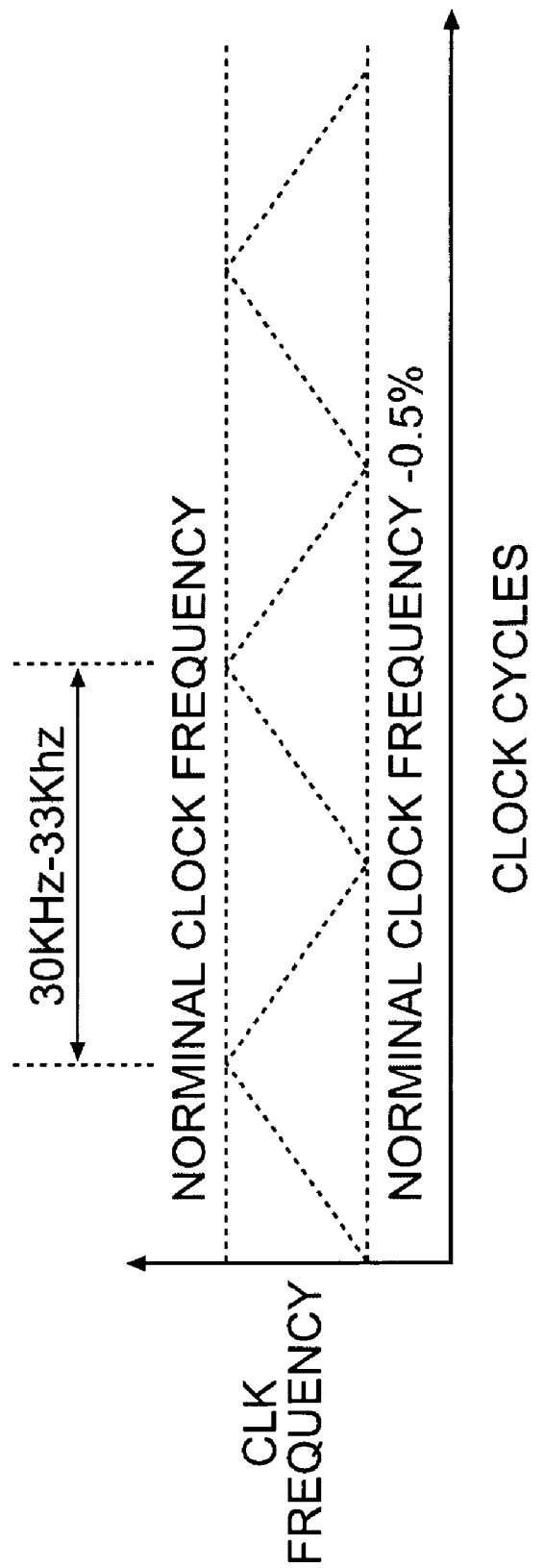
FIG. 2 illustrates frequency variations allowed with spread spectrum clocking.

Spread spectrum clocking is accomplished by slowly modulating the frequency of the system clock back and forth a small amount. The PCI-Express Specification allows down spread spectrum clocking; that is, data rate may be modulated +0% to −0.5% from nominal data rate frequency, at a modulation rate in the range of 30 Khz to 33 Khz. See FIG. 2. However, the PCI-Express Specification still requires the transmitter and receiver clocks to be within +/−300 ppm of each other even when spread spectrum clocking is enabled. This requirement can not be guaranteed in systems with a non-common reference clock.

PCI-Express uses a source synchronous timing architecture. In a source synchronous timing architecture, both data and a clock are transmitted from the originating device's driver. The receiving device recovers the clock to allow synchronization of data. PCI-Express uses a scheme where the forwarded clock is embedded into the data stream using IBM's 8B/10B encoding tables. This encoding mechanism ensures that the data stream will have a sufficient number of 0-to-1 and 1-to-0 transitions to allow the clock to be recovered. This mechanism obviates the need to minimize skew, but creates, instead, a two-clock domain. That is, due to the allowed 600 ppm tolerance band, two devices connected to each other by a PCI-Express connection can, and most likely will, be operating at slightly different frequencies.

Figure 1B:
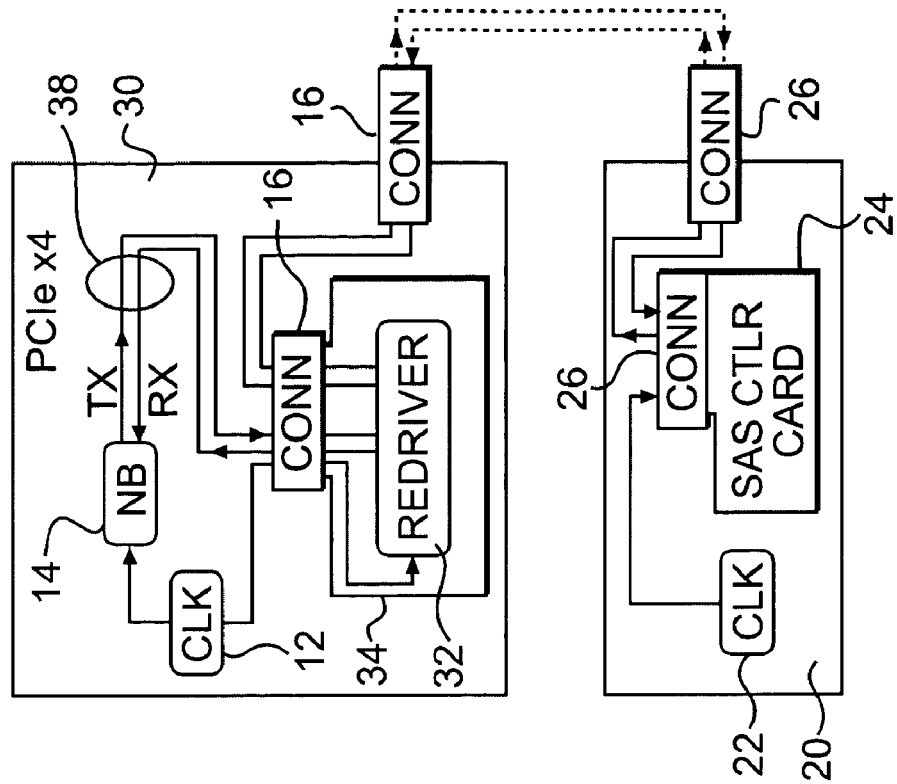
FIGS. 1A and 1B illustrate embodiments of multiple blade architectures.
Figure 1A:
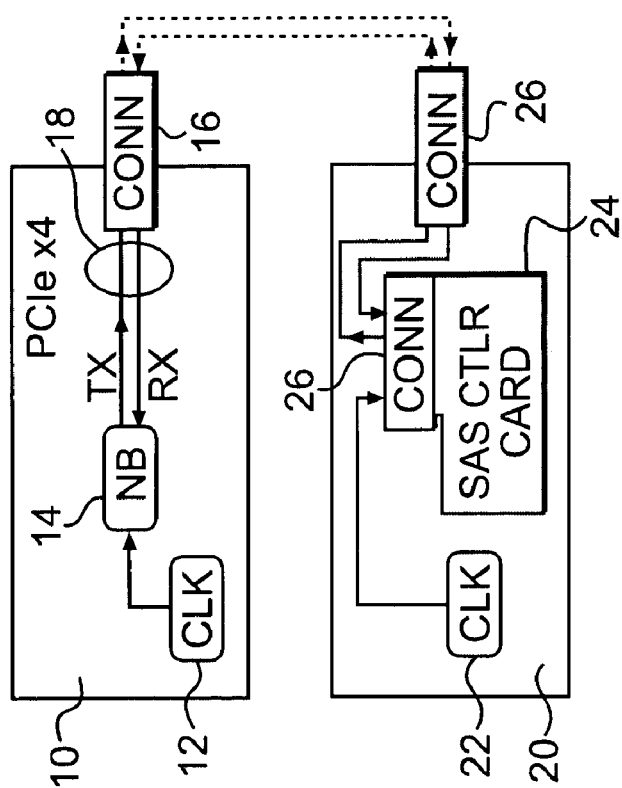

To increase SAS storage capacity in a bladed architecture, a storage blade product is provided for installation next to any C-class server blade. Communication between the server blade and storage blade is through a x4 PCI-Express link. Two possible PCI-Express link configurations, direct and indirect, are shown in FIGS. 1A and 1B, respectively. In FIG. 1A, a half height C-class server blade 10 is coupled to a storage blade 20. A direct link is established when PCI-Express bus 18 is connected directly from North-Bridge (NB) 14 on the server blade 10 to SAS control card 24 on the storage blade 20 by way of connections 16 and 26. Also shown on the cards 10 and 20 are clocks 12 and 22, respectively. Note that the clocks 12 and 22 are non-common reference clocks, a fact that can lead to system failures when spread spectrum clocking is enabled.

In FIG. 1B, a full height C-class server blade 30 is installed next to storage blade 20. PCI-Express bus 38 on the C-class server blade 30 is connected from the North-Bridge 14 to a redriver chip 32, and then from the redriver chip 32 to the SAS control card 24 on the storage blade 20. The use of the redriver chip 32 accounts for additional signal loss due to a longer trace length of the PCI-Express bus 38. The redriver chip 32 is mounted on a mezzanine card 34. The two blades 20 and 30 employ non-common reference clocks 22 and 12, respectively.

Figure 3:
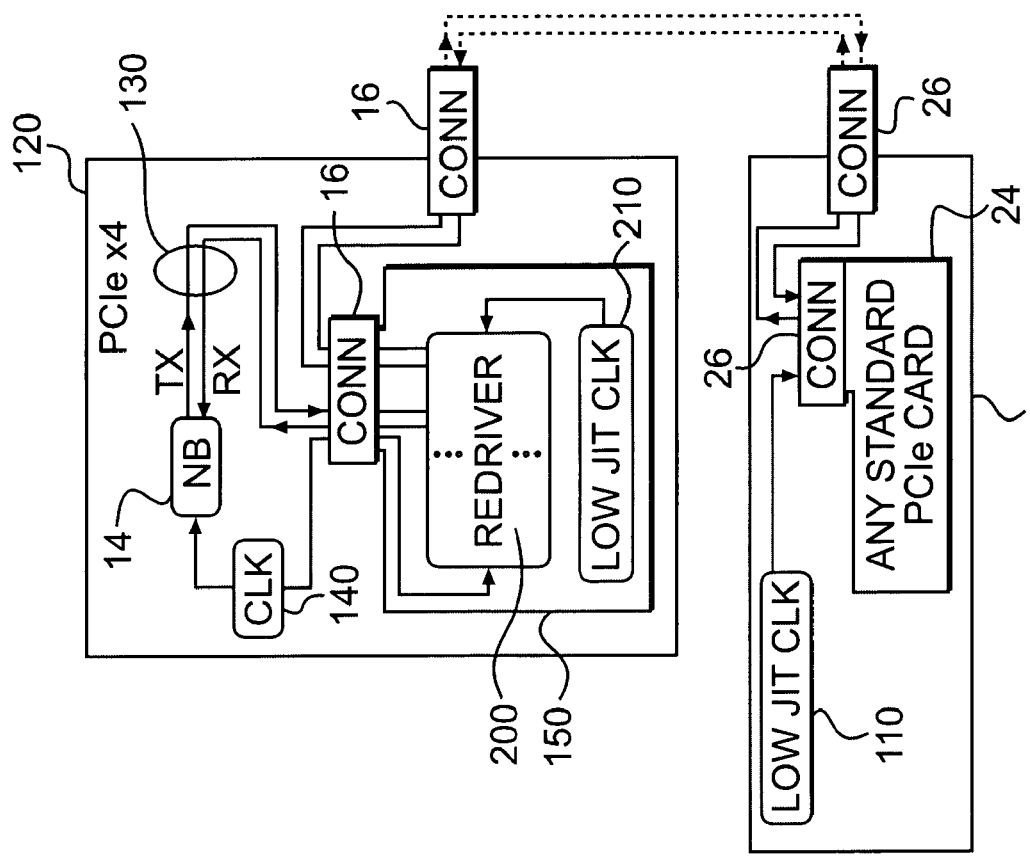
FIG. 3 illustrates an embodiment of a multiple blade architecture using two reference clocks.

To resolve the problems posed by spread spectrum clocking in server/storage blade applications, the architectures disclosed herein provide two reference clocks. An example of such an architecture is shown in FIG. 3 in which a storage blade 100 is mated to a server blade 120. The server blade 120 may be any type of server blade including, for example, a C-class server blade. The storage blade includes a PCI-Express card 24, connectors 26 and a low jitter clock 110. A low jitter clock typically has less than 100 ppm (parts per million) of phase jitter. By contrast, low cost clocks have more than 300 ppm of phase jitter. With a low jitter clock, not only is the phase jitter low, but also the low jitter clock is resistant to power noise modulation, and the clock frequency is very stable. Note that any blade that does not use a common reference clock cannot accommodate spread spectrum clocking. This is because the elastic buffer normally installed in a PCI device can compensate only for 600 ppm between the recovered clock and the local clock, and hence cannot be used with spread spectrum clocking, which can have up to 5,600 ppm of skew.

The server blade 120 includes North-Bridge 14, PCI-Express link 130, connectors 16, a redriver 200 mounted on card 150, and clock 140 coupled to the North-Bridge side of the redriver 200. As shown in FIG. 3, the North-Bridge 14 uses a reference clock (clock 140) that is common to the North-Bridge side of redriver 200. While the North-Bridge 14 does not have an elastic buffer that can adjust drain and fill rates so as to accommodate spread spectrum clocking, the redriver 200 does have such an elastic buffer, as will be discussed with respect to FIGS. 4-6. By using a common reference clock between the redriver 200 and the North-Bridge 14, the benefits of spread spectrum clocking can be applied to the North-Bridge 14.

Coupled to the storage blade side of the redriver 200 is low jitter clock 210. The low jitter reference clock 210 and the low jitter reference clock 110 have the same circuit design. Because of the above-described architecture, the redriver 200 operates with two clock architectures, that of the common reference clock architecture 140 and that of the separate reference clock architecture 210. The use of the two reference clock architecture supports the (slight) difference in clock frequencies between two devices, such as one device with spread spectrum clocking enabled (e.g., the North-Bridge 14) and the other device clocked with a normal clock (e.g., the storage blade 100); or two devices, each clocked with spread spectrum clocking.

As noted above, in a synchronous timing architecture, a common clock source supplies a clock to all devices on the bus, and that clock is used to enable the devices' transceivers to clock data in and out. This architecture requires that the clock arrive at each device at precisely the same time. However, a small amount of pin-to-pin skew is allowed, which means that the lengths of the clock traces have to be matched to minimize the skew between the devices. As the speed of the clock increases, the allowed pin-to-pin skew decreases, which makes the matched routing of the clock traces more difficult to achieve.

With the use of two reference clock architectures, namely the common reference clock architecture and separate reference clock architecture, for data to flow through the redriver 200, the data will have to cross the boundary between the common reference clock and the separate reference clock. This boundary is indicated, figuratively, by the dotted line bisecting the redriver 200 in FIG. 3. To transition this boundary, the redriver 200 includes elastic buffers on its inbound and outbound sides. Bridging this boundary is accomplished by depositing the received data into an elastic buffer using one clock architecture and pulling the data out of the elastic buffer using the other clock architecture. Since the two reference clocks can be running at slightly different frequencies and spread spectrum clocking can be enabled for the North-Bridge 14, the elastic buffer can experience an overflow or an underflow error condition. To eliminate these errors, the elastic buffet fill and drain rates may be adjusted. One means for adjusting these rates involves addition or removal of special symbols that are used in PCI-Express architectures. These symbols are known as SKP symbols, and are found in SKP ordered sets. SKP ordered sets are used to maintain synchronization between a transmitter and a receiver and to prevent overflow or underflow error conditions. The receiver can discard the SKP characters. An SKP ordered set consists of a single COM symbol followed by three SKP symbols. Other means for adjusting the fill and drain rates will be discussed later.

The rate at which SKP ordered sets are transmitted is derived from the maximum frequency tolerance allowed between two devices, namely 600 ppm. At this level, the local clocks of the two devices shift one clock cycle every 1,666 cycles. Therefore, the transmitter must schedule a SKP ordered set to be sent more frequently than every 1,666 clock cycles. The PCI-Express Specification defines the period between SKP ordered set transmissions as between 1,180 and 1,538 symbol times. Upon receipt of the SKP ordered set, an elastic buffer can insert or remove SKP symbols to compensate for frequency differences between the two clock domains.

Figure 4:
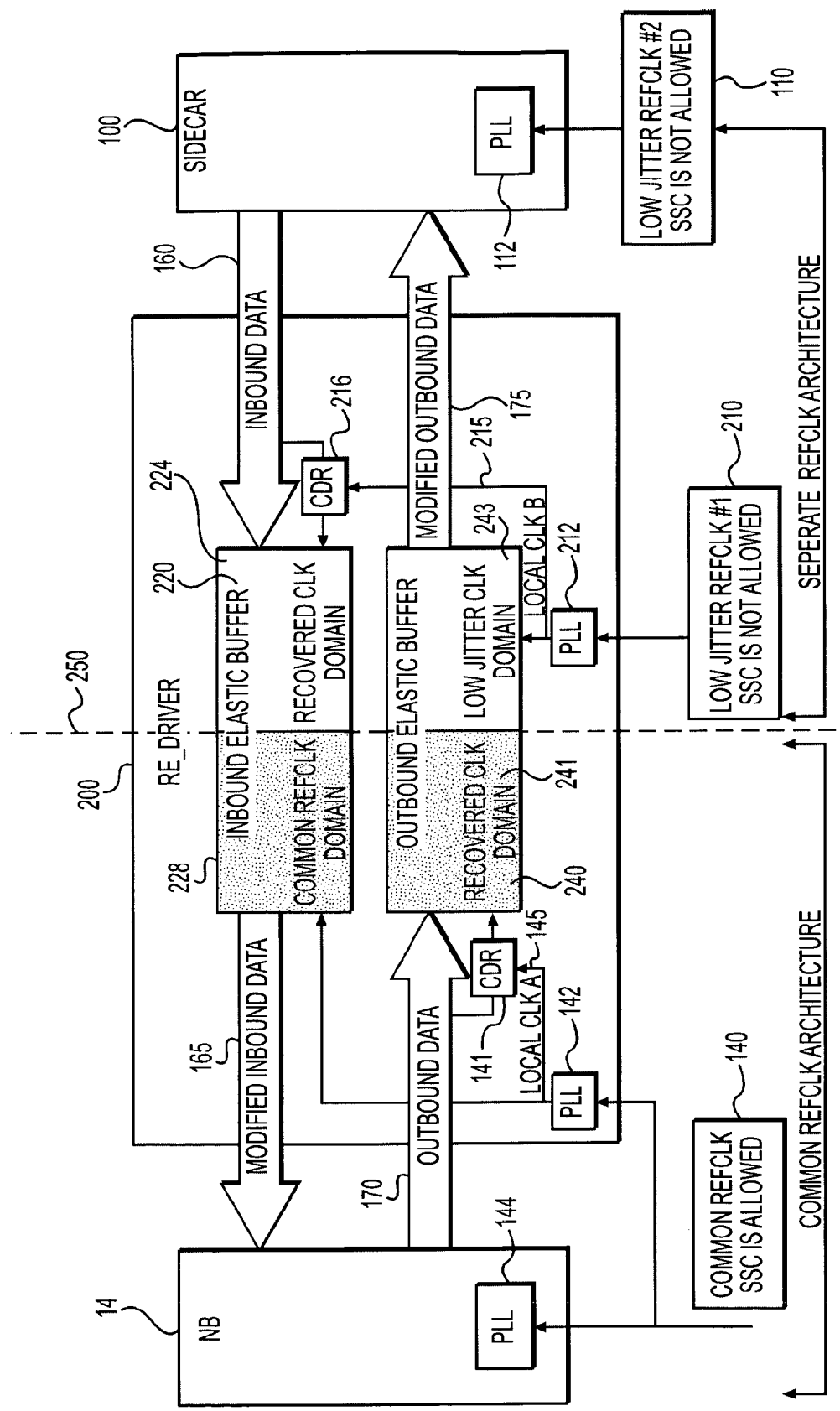
FIG. 4 illustrates an embodiment of a two reference clock redriver architecture.

FIG. 4 illustrates a redriver with two reference clocks in more detail. In FIG. 4, redriver 200 is shown coupling storage blade 100 and North-Bridge 14. However, the redriver 200 may be used in other applications, including coupling any two blade types, for example. The redriver 200 includes inbound elastic buffer 220 through which data from the storage blade 100 is transmitted to the North-Bridge 14 and outbound elastic buffer 240 through which data from the North-Bridge 14 is transmitted. As can be seen from FIG. 4, the North-Bridge side of the redriver 200, including the inbound and the outbound elastic buffers 220/240, uses common reference clock 140. The common reference clock 140 may have spread spectrum clocking enabled. The storage blade side of the redriver 200 uses a separate low jitter clock 210. The low jitter reference clock 210 does not use spread spectrum clocking. The storage blade 100 also uses a separate low jitter reference clock 110, which also does not allow for spread spectrum clocking. The reference clocks 110, 140, and 210 have standard 100 MHz clock sources, which are used as inputs to phase locked loops (PLLs) to generate higher frequency clocks for internal logics and CDR (Clock Data Recovery). For example, PLL 145 may convert the 100 MHz clock to 2.5 GHz.

Data 160 from the storage blade 100 enters the inbound elastic buffer 220 at a nominal 2.5 GHz and data 165 exiting the inbound elastic buffer 220 exits at a nominal 2.5 GHz. Similarly data 170 enters the outbound elastic buffer 240 at a nominal 2.5 GHz and data 175 exits the outbound elastic buffer 240 at a nominal 2.5 GHz. The inbound data 160 has an embedded clock that is recovered by clock recovery circuit 216. Clock recovery circuit 216 uses local clock B signal 215, which is derived from the output of PLL 212 based on the low jitter reference clock 210. Local clock B signal 215 also is used to clock data out of the outbound elastic buffer 240. Outbound data 170 has an embedded clock that is recovered by clock recovery circuit 141. Clock recovery circuit 141 uses local clock A signal 145, which is derived from the output of PLL 142 based on the common reference clock. Local clock A signal 145 also is used to clock data out of inbound elastic buffer 220.

Since the storage blade 100 does not use spread spectrum clocking and the North Bridge 14 does use spread spectrum clocking (when enabled), the inbound data 160 always will be at a faster clock than the inbound data 165. Conversely, the outbound data 170 always will be at a slower clock that the outbound data 175. The difference in clock frequency between the transmitter (TX) and receiver (RX) can be as much as 5600 ppm. To accommodate these clock differences, the inbound elastic buffer 220 and the outbound elastic buffer 240 must be able to adjust their fill and drain rates using steps that are not available with current PCI-Express elastic buffers.

Figure 7:
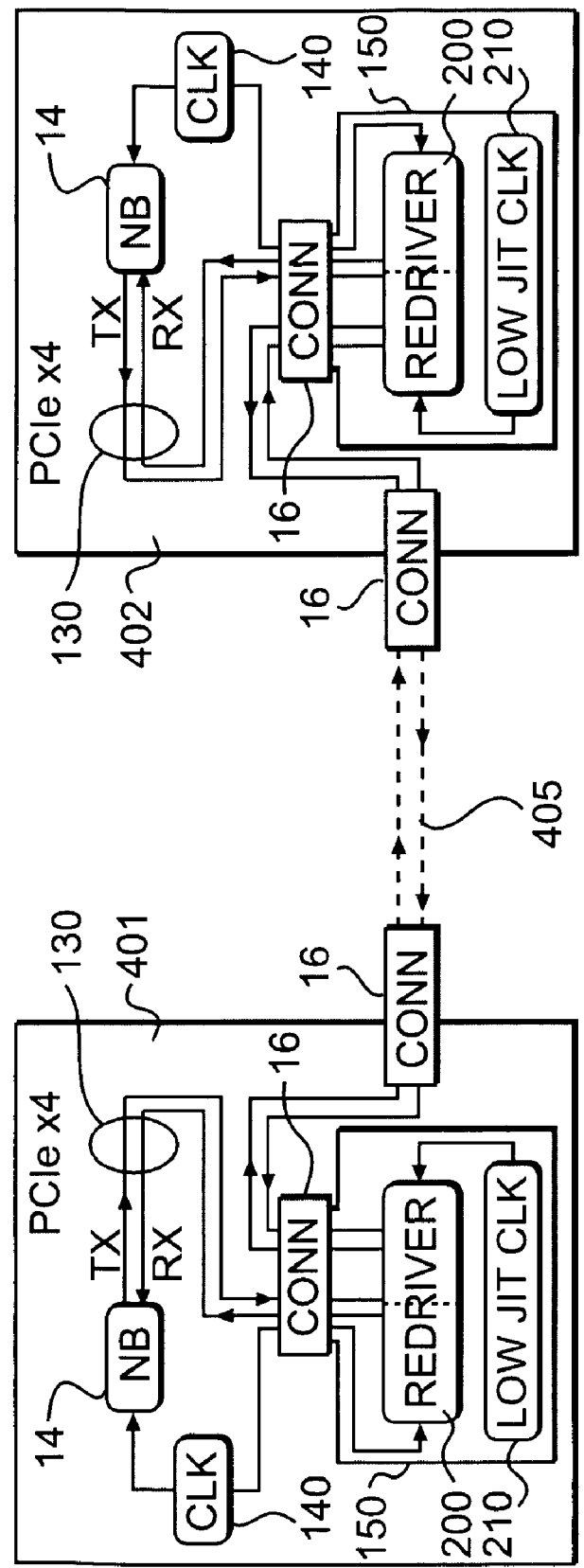
FIGS. 7-9 illustrate alternate applications of two reference clock architectures.

Note that in applications where common types of storage blades are coupled using the redriver 200, the use of spread spectrum clocking may cause additional clock differences. Such an architecture is shown in FIG. 7.

Figure 5:
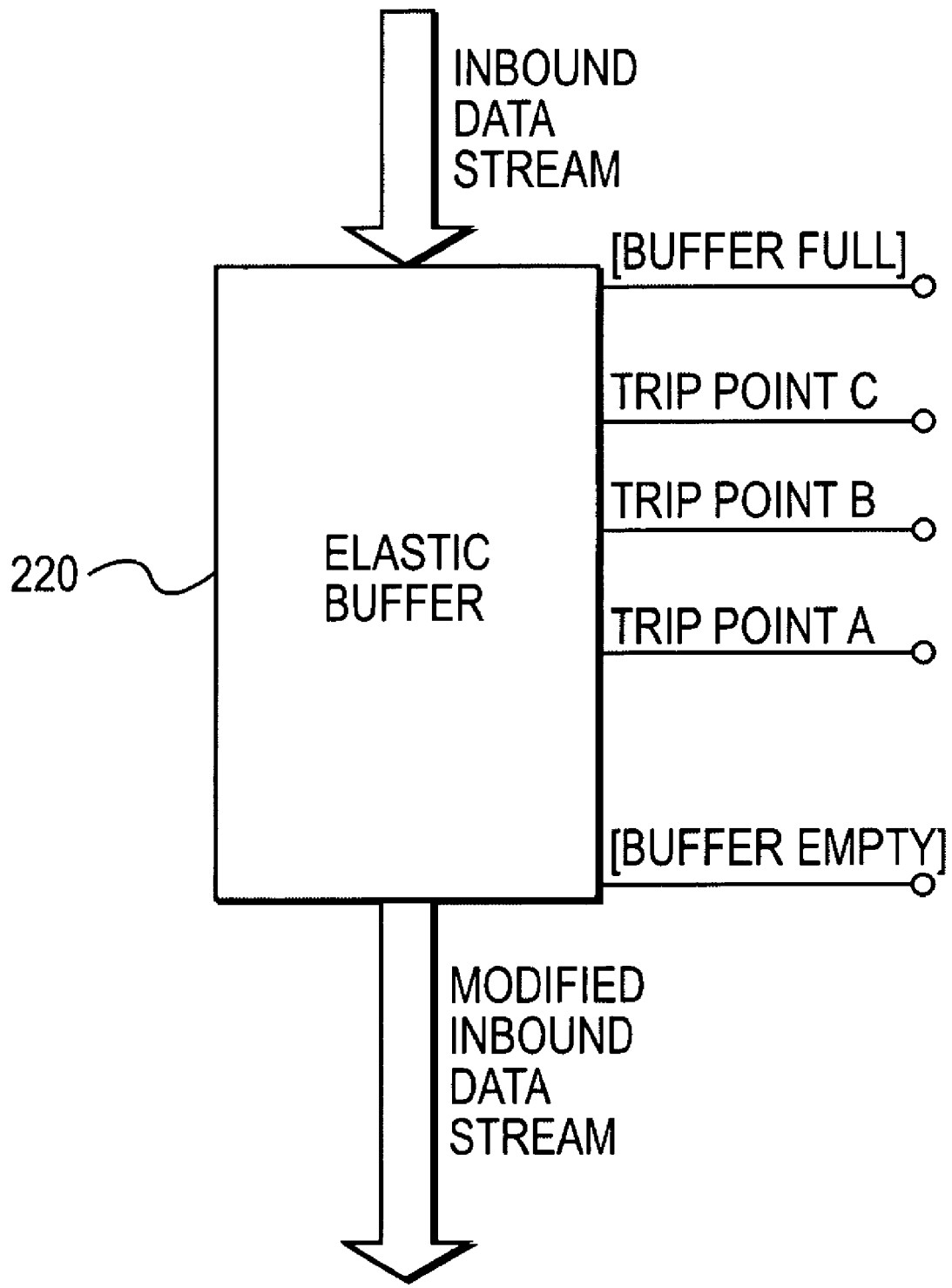
FIG. 5 illustrates an embodiment of an elastic buffer operation used with the two reference clock redriver architecture for a fast recovered clock.

FIG. 5 illustrates an embodiment of an elastic buffer operation used with the redriver 200 of FIG. 4 for a fast recovered clock. Elastic buffer 220 receives an inbound data stream and provides a modified inbound data stream. The elastic buffer 220 may be operated such that it is normally half full, or just below trip point A. In the case of a fast recovered clock, when the elastic buffer contents reaches trip point A, because the elastic buffer 220 is situated at an intermediate point and thus cannot alter SKP ordered sets, buffer logic within the elastic buffer 220 first removes idle data from the inbound data stream if the PCI-Express link is in the active state (i.e., if the link has been powered up and passed the link training states). If the PCI-Express link is in the training state, the buffer logic will remove an entire training ordered set. Note that link training automatically occurs on all PCI Express links after reset without software involvement. Most link training states involve the transmission of 16-symbol training ordered sets. Each component's receiver uses the sets to obtain bit lock, symbol lock, and lane-to-lane skew. The exchange of these sets helps the components on each end of the link negotiate a link number, lane numbers, data rate, etc. When training is complete, the link goes to the active state in which Transaction Layer Packets (TLPs) can be exchanged. Should the elastic buffer contents reach trip point B, the buffer logic would remove selected Data Link Layer Packets (DLLP) from the inbound data stream. PCI Express is designed such that the information contained in each DLLP is also contained in subsequent DLLPs of the same type, so that a DLLP that is corrupted or lost in transit has a minimal effect on link performance. If multiple successive DLLPs of the same type are lost, however, performance degradation will occur (it can cause transaction replay and/or inhibit the issuance of new transactions). DLLPs begin with an unscrambled "SDP" framing symbol followed by a DLLP Type byte. The buffer logic within the elastic buffer 220 may be designed to remove four DLLP types in particular: Acknowledges, Posted Credit Updates, Non-posted Credit Updates, and Completion Credit Updates. The herein described flexible buffers use semaphores to prevent deletion of multiple DLLPs of the same type. For example, a fast recovered clock may cause the buffer logic to discard a Posted Credit Update DLLP. When this occurs, an internal Posted Credit Update semaphore is set to prevent the logic from discarding another Posted Credit Update until another Posted Credit Update (of the same virtual channel) passes through. The second Update contains the same number of credits as the previous packet plus it may contain additional credits. Passing the second packet through removes a potential bottleneck in outbound, posted cycles. Finally, should the contents of elastic buffer 220 reach trip point C, the buffer logic discards a Transaction Layer Packet (TLP) from the inbound data stream. The buffer logic accomplishes this by looking for the TLP start framing symbol (STP), and discarding every symbol until it detects the END symbol. This will cause the transmitter to replay the TLP, either due to a Negative Acknowledge (Nak) of a subsequent TLP or due to an Acknowledge (Ack) timeout. The sequence number for the removed TLP is stored in local register for comparison to future outbound Ack packets. When an outbound Ack verifies that the discarded TLP has been successfully replayed, TLP disposal logic resets itself for the next time the elastic buffer fills beyond trip point C. This prevents excessive TLP replays, which can seriously hamper link performance.

Figure 6:
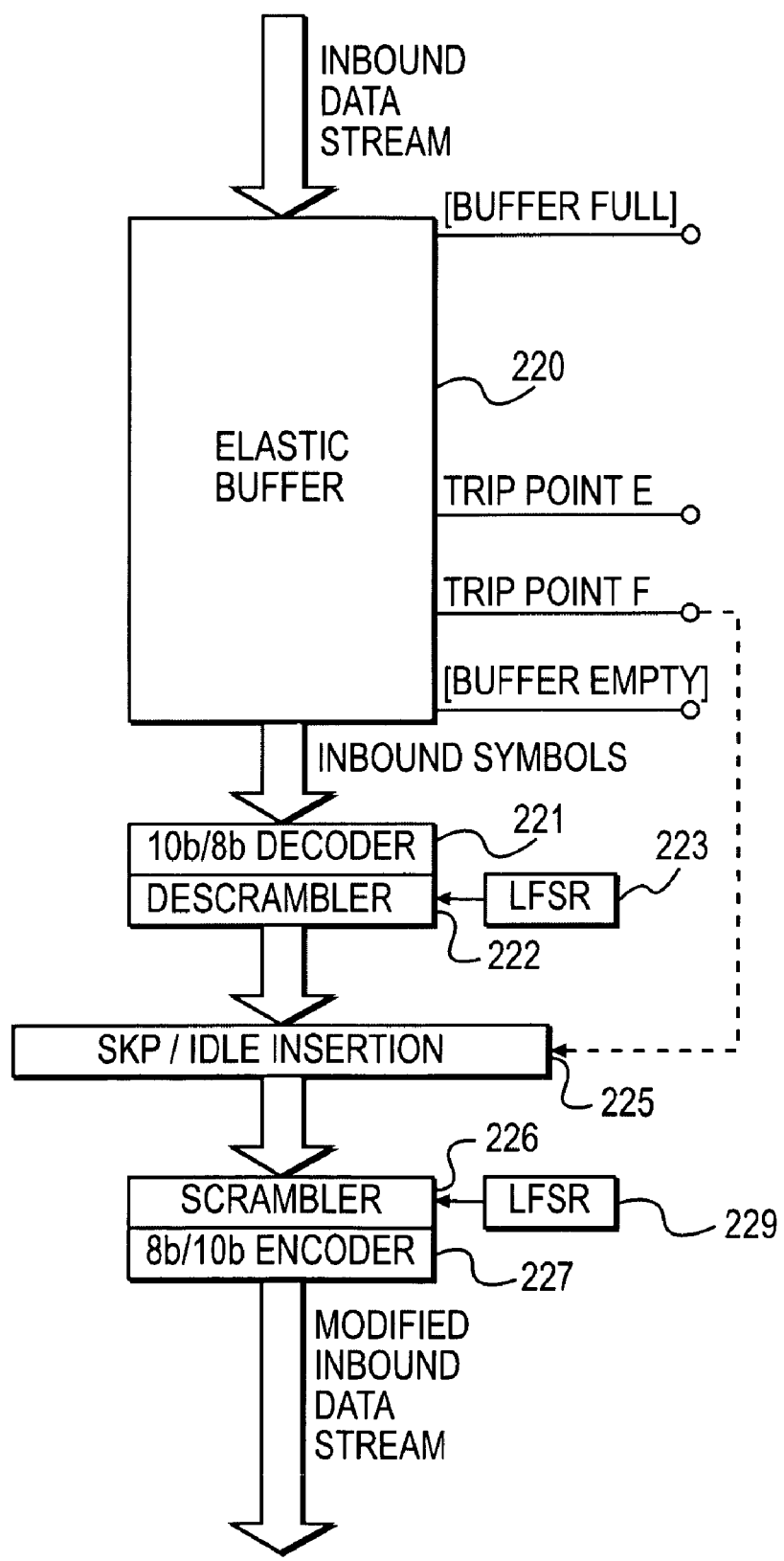
FIG. 6 illustrates an embodiment of an operation of the elastic buffer for a slow recovered clock.

In the case of a slow recovered clock, the PCI-Express Specification calls for the addition of SKP symbols to the SKP ordered set. Such a scenario is shown in FIG. 6. At trip point E, the buffer logic associated with a typical elastic buffer, such as the elastic buffer associated with components upstream and downstream of the elastic buffer 220, adds SKP symbols to the buffer contents. Similarly, at trip point E, the buffer logic associated with the elastic buffer 220 adds a SKP ordered set to the data stream. Note that since the redriver 200 is an intermediate buffer and not the final receiver on the link, the redriver 200 must not alter the size of the SKP ordered set. However, in some cases, even the addition of SKP symbols is not enough to prevent emptying the elastic buffer 220. When the PCI Express link is in the active state, the PCI Express specification allows the addition of logical idle data to the data stream. Accordingly, at trip point F, with the link in the active state, the buffer logic adds idle data to the data stream exiting the elastic buffer 220.

To allow the addition of SKP ordered sets and the subtraction of DLLPs and TLPs, the redriver 200 includes typical PCI Express components such as a 10/8b decoder 221, descrambler 222, linear feedback shift register (LSFR) 223, SKP/idle insertion module 225, scrambler 226, 8b/10b encoder 227, and outbound linear feedback shift register (LSFR) 229 as shown in FIG. 6. The decoder 221 converts the 10-bit inbound symbols to 8-bit bytes, and the descrambler 222 uses the LSFR 223 to convert the bytes to unscrambled bytes. At this point the data stream can be analyzed for the aforementioned framing symbols. Note that SKP ordered sets are not added in the middle of any other ordered set or packet. After manipulation of the data stream, the scrambler 226 uses the outbound LFSR 229 to rescramble the bytes, and the 8b/10b encoder 227 converts the 8-bit bytes back into 10-bit symbols.

FIGS. 5 and 6 illustrate operation of the inbound elastic buffer 220. The inbound elastic buffer 220 is a two reference clock elastic buffer architecture. The outbound elastic buffer 240 also is a two reference clock architected buffer, and the architecture and method for preventing overflow and underflow of the outbound elastic buffer 240 is similar in all pertinent respects to the architecture and method applicable to the inbound elastic buffer 220.

Figure 8:
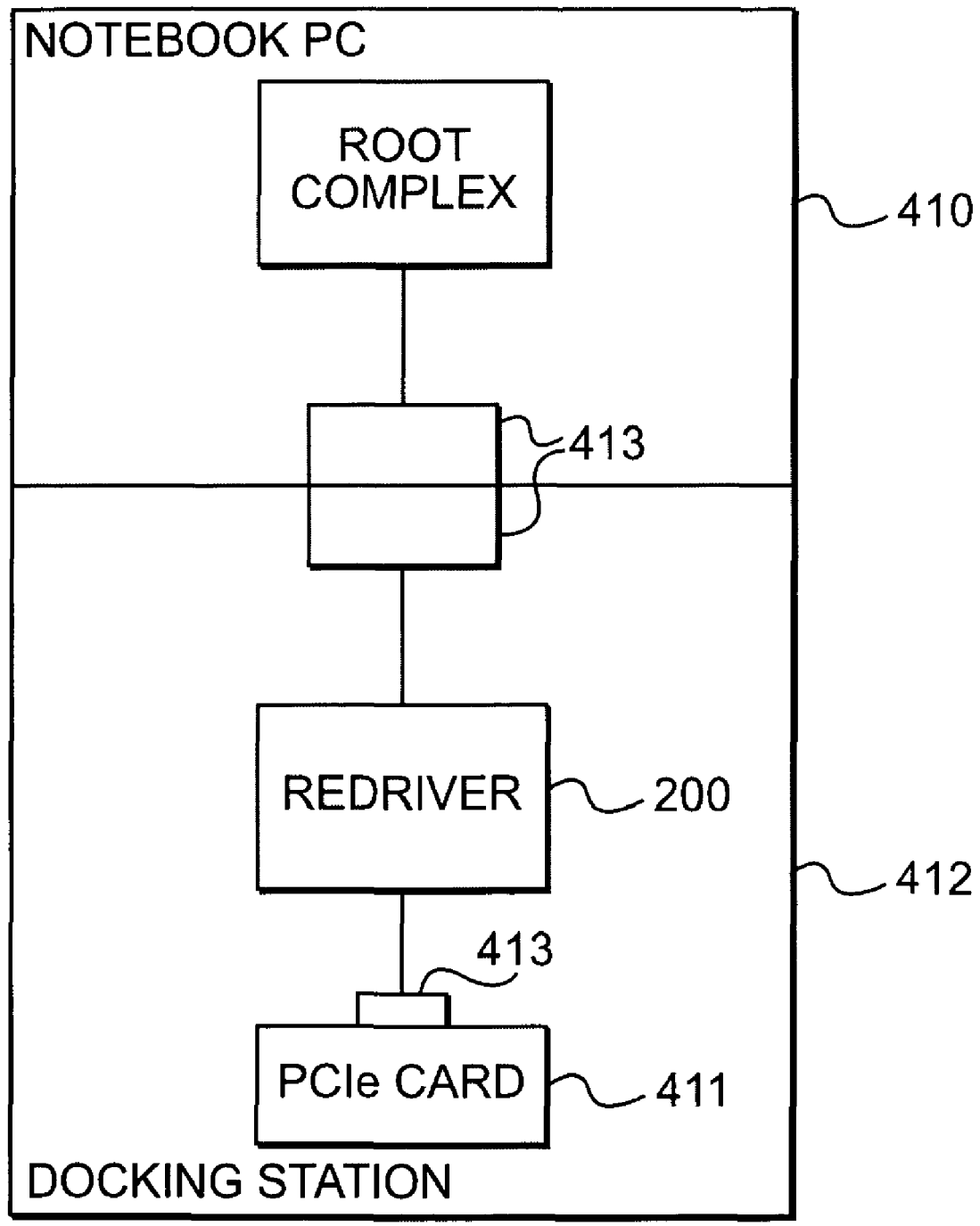
Figure 9:
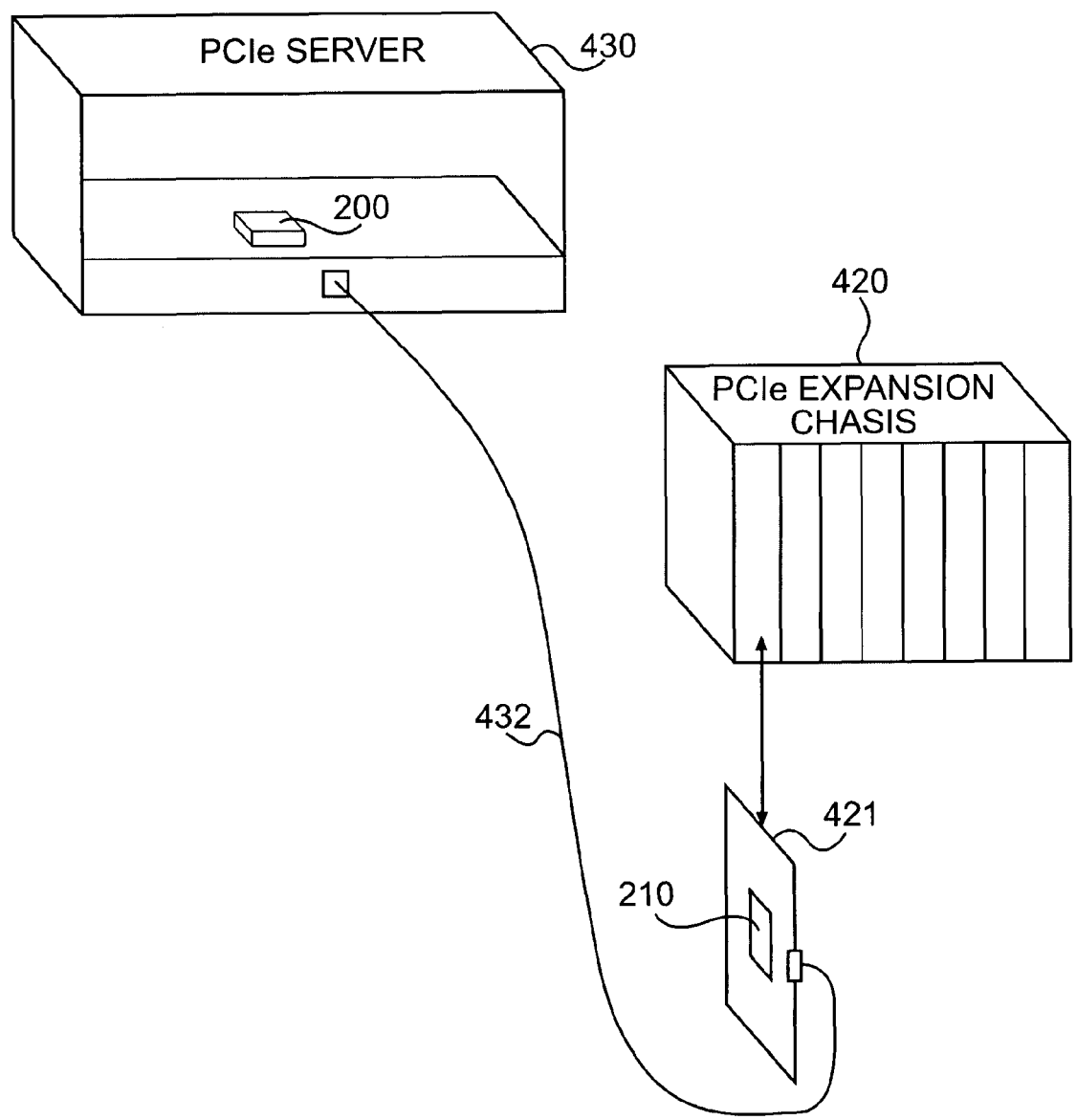

FIGS. 7-9 illustrate embodiments of computer systems employing redrivers to ensure signal continuity and fidelity across multiple connections and varying-length trace lengths.

Figure 10:
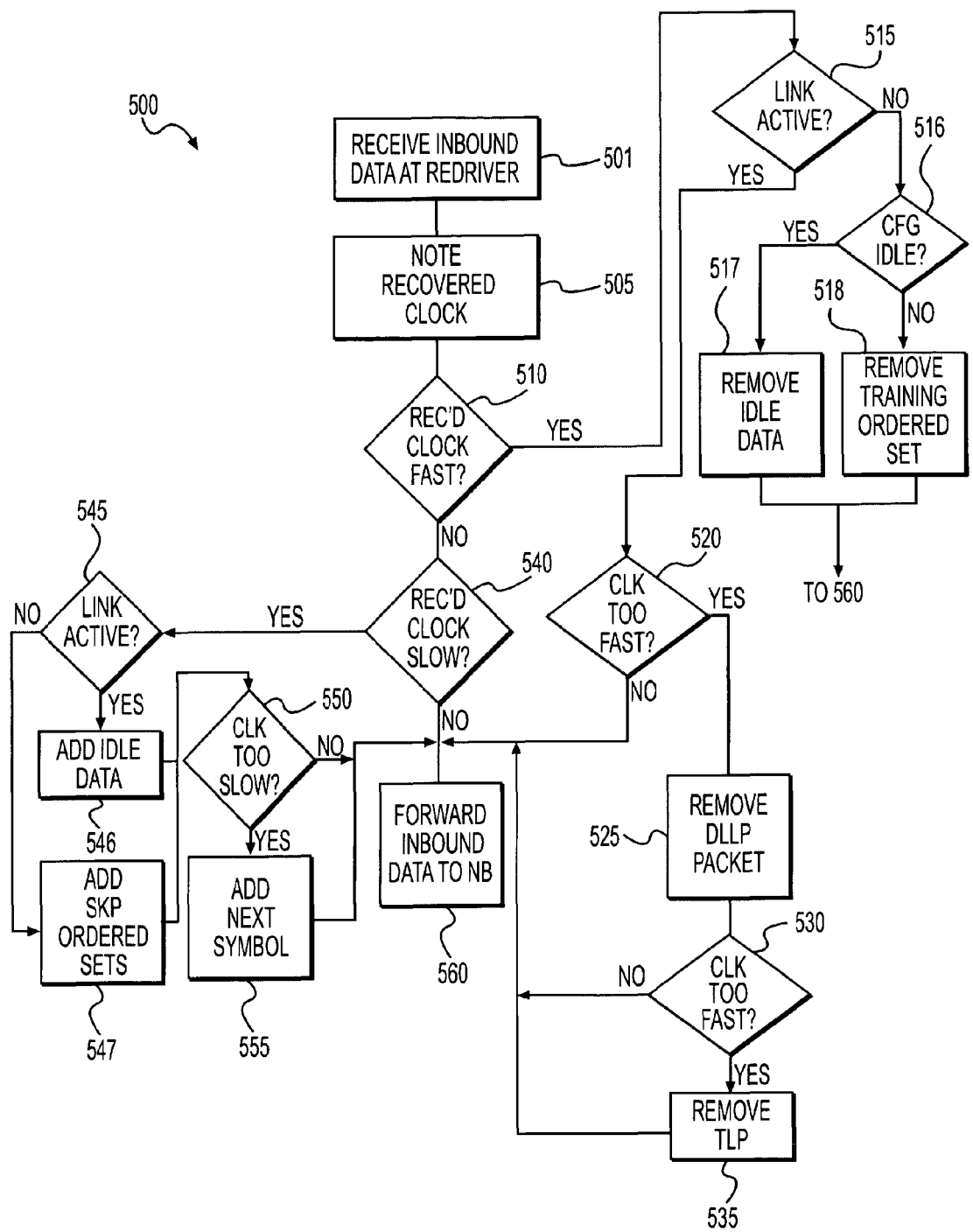
FIG. 10 is a flowchart illustrating an embodiment of a method for operating a computer system component having two reference clocks.

FIG. 10 is a flowchart illustrating an embodiment of a method 500 for operating a computer system, such as the computer system of FIG. 3, having a two reference clock architecture. In FIG. 10, starting a block 501, the redriver 200 receives an inbound data stream (inbound in the sense that the data stream emanates from storage blade 100), the inbound data stream having a recovered clock. In block 505, buffer logic associated with inbound elastic buffer 220 notes the recovered clock. In block 510, the inbound elastic buffer 220 determines if the recovered clock is fast relative to the system clock 140. If the recovered clock is fast, the method 500 moves to block 515 and the link is checked to see if the link is active. If the link is active, the method 500 moves to block 520. If the link is not active, the method 500 moves to block 516 to determine if the link is in the "Configuration.Idle" training sub-state. If the link is not in "Configuration.Idle", then in block 518, the buffer logic associated with the buffer 220 removes a training ordered set. If the link is in the "Configuration.Idle" sub-state, the method 500 moves to block 517 and the buffer logic associated with the inbound buffer 220 removes idle data from the inbound data stream. At this point the logic forwards inbound data to NB (block 560). Following blocks 517 or 518 the method 500 moves to block 560. In block 520, the buffer logic associated with the inbound buffer 220 determines if the recovered clock still is too fast. If the recovered clock still is too fast, the method 500 moves to block 525 and the buffer logic removes a DLLP symbol and sets a corresponding semaphore. The method 500 then moves to block 530. In block 530, the buffer logic again determines if the recovered clock is too fast. If the recovered clock still is too fast, then in block 535, the buffer logic removes a TLP packet from the data stream and sets a TLP semaphore. The method then moves to block 560.

Returning to block 530, if the recovered clock is not too fast, the method 500 moves to block 560. Returning to block 520, if the recovered clock is not too fast, the method 500 moves to block 560.

Returning to block 510, if the recovered clock is not too fast, the method 500 moves to block 540 and the buffer logic associated with the inbound flexible buffer 220 determines if the recovered clock is too slow. If the recovered clock is not too slow, the method 500 moves to block 560. If the recovered clock is too slow, the method 500 moves to block 545 and the link is checked to see if the link is active. If the link is active, the method 500 moves to block 546 and idle data are added to the inbound data stream. If the link is not active, then in block 547 the buffer logic adds SKP symbols to the inbound data stream. The method then moves to block 550 and the buffer logic again checks to see if the recovered clock is too slow. If the recovered clock still is too slow, the method 500 moves to block 555 and the buffer logic adds idle data to the inbound data stream. The method then moves to block 560 and the inbound data stream is passed to the North-Bridge 14.

The invention claimed is:

1. A redriver having two reference clocks, the redriver coupling an external component through a PCI Express link to a hub, the redriver, comprising:
   an inbound elastic buffer, comprising:
      a separate reference clock for an inbound elastic buffer interface between the redriver and the external component,
      a common reference clock for an inbound elastic buffer interface between the hub and the redriver, and
      an inbound decoder/descrambler, an inbound scrambler/encoder, and inbound linear shift registers;
   an outbound elastic buffer, comprising:
      the separate reference clock for an outbound elastic buffer interface between the redriver and the external component,
      the common reference clock for an outbound elastic buffer interface between the hub and the redriver, and
      an outbound decoder/descrambler, an outbound scrambler/encoder, and outbound linear shift registers; and
   clock recovery logic coupled an external component side of the redriver and to a hub side of the redriver.

2. The redriver of claim 1, wherein the inbound elastic buffer further comprises buffer logic and overflow trip points, the overflow trip points comprising:
   a first overflow trip point wherein when the first overflow trip point is reached and the link is in an inactive state, the buffer logic removes one of idle data and an entire training set from a data stream;
   a second overflow trip point, wherein when the second overflow trip point is reached, the buffer logic removes DLLP packets from the data stream; and
   a third overflow trip point, wherein when the third overflow trip point is reached, the buffer logic removes Transaction Layer Packets from the data stream.

3. The redriver of claim 2, further comprising DLLP semaphores, wherein when a specific type DLLP packet is removed from the data stream, the buffer logic sets a corresponding DLLP semaphore, whereby further removal of that type DLLP packet is prevented.

4. The redriver of claim 2, further comprising Transaction Layer Packet semaphores, wherein when a Transaction Layer Packet is removed, a Transaction Layer Packet semaphore is set.

5. The redriver of claim 4, further comprising a local register that stores sequence numbers for removed Transaction Layer Packets, whereby when the removed Transaction Layer Packet is restored, the stored sequence number is deleted from the local register and the Transaction Layer Packet semaphore is reset.

6. The redriver of claim 2, wherein the inbound elastic buffer further comprises:
   a first underflow trip point, wherein when the first underflow trip point is reached, the buffer logic adds SKP symbols to the data stream exiting the inbound elastic buffer; and
   a second underflow trip point, wherein when the second underflow trip point is reached, the buffer logic adds idle data to the data stream exiting the inbound elastic buffer.

7. The redriver of claim 1, wherein the outbound elastic buffet further comprises:
   buffer logic;
   overflow trip points, wherein the buffer logic removes one or more of idle data, a training set, DLLP packets, and Transaction Layer Packets when the overflow trip points are reached; and
   underflow trip points, wherein the buffer logic adds SKP symbols and idle data to the data stream exiting the outbound elastic buffer when the underflow trip points are reached.

8. The redriver of claim 1, wherein the redriver is installed on a server blade, and wherein a storage blade is coupled to the server blade using the PCI-Express link.

9. The redriver of claim 1, wherein the redriver is installed on a first server blade, and wherein a second server blade is coupled to the first server blade using the PCI Express link, the second server blade comprising a second two-clock redriver.

10. The redriver of claim 1, wherein the separate reference clock is driven by a 100 MHz low jitter clock.

11. The redriver of claim 1, wherein the bus is a North-Bridge with spread spectrum clocking enabled, and wherein the external component is a storage blade with spread spectrum clocking disabled.

12. A redriver employing two reference clocks, the redriver having an inbound data portion and an outbound data portion, the signal conditioner, comprising:
   an inbound elastic buffer comprising means for adjusting inbound data to compensate for the two reference clocks;
   an outbound elastic comprising means for adjusting outbound data to compensate for the two reference clocks;
   a common reference clock coupled to a first side of the redriver;
   a separate low jitter reference clock coupled to a second side of the redriver; and
   clock recovery logic coupled to the first and the second side of the redriver, wherein the clock recovery logic coupled to the first side of the redriver uses the common reference clock and the clock recovery logic coupled to the second side of the redriver uses the separate low jitter reference clock.

13. The redriver of claim 12, wherein the inbound elastic buffer comprises:
   an inbound elastic buffer recovered clock domain; and
   an inbound elastic buffer common reference clock domain.

14. The redriver of claim 13, wherein the means for adjusting inbound data to compensate for a the two reference clocks comprises:
   an inbound decoder/descrambler;
   an inbound scrambler/encoder; and
   inbound liner shift registers, all coupled to the inbound elastic buffer system clock domain.

15. The redriver of claim 14, wherein the means for adjusting inbound data to compensate for a separate reference clock further comprises buffer logic and overflow trip points, the overflow trip points comprising:
   a first overflow trip point wherein when the first overflow trip point is reached, the buffer logic removes one of idle data and as training set from an inbound data stream;
   a second overflow trip point, wherein when the second overflow trip point is reached, the buffer logic removes DLLP packets from a data stream; and
   a third overflow trip point, wherein when the third overflow trip point is reached, the buffer logic removes Transaction Layer Packets from the data stream.

16. The redriver of claim 12, wherein the outbound elastic buffer comprises:
   an outbound elastic buffer common reference clock domain; and
   an outbound elastic buffer low jitter reference clock domain.

17. The redriver of claim 16, wherein the means for adjusting the outbound data to compensate for a non-common reference clock comprises:
   an outbound decoder/descrambler;
   an outbound scrambler/encoder; and
   outbound liner shift registers, all coupled to the outbound elastic buffer low jitter clock domain.

18. The redriver of claim 17, wherein the means for adjusting the outbound data to compensate for a separate reference clock comprises:
   buffer logic;
   overflow trip points, wherein the buffer logic removes one or more of idle data, DLLP packets, and Transaction Layer Packets when the overflow trip points are reached; and
   underflow trip points, wherein the buffer logic adds SKP symbols and idle data to the data stream exiting the outbound elastic buffer when the underflow trip points are reached.

19. A method for operating a computer system shaving a redriver with two reference clocks, comprising:
   recovering a clock from an inbound data stream;
   comparing the recovered clock to a system clock;
   if the recovered clock is too fast:
      removing one of idle data and a training set from the inbound data stream, and if the recovered clock still is to fast, removing a DLLP packet from the inbound data stream, and if the recovered cloak still is too fast,
removing a TLP packet from the inbound reference stream;
if the recovered clock is too slow:
adding SKP symbols to the inbound data stream, and if the recovered clock still is too slow,
adding idle data to the inbound data stream.

20. The method of claim 17, further comprising:
setting a DLLP semaphore when removing the DLLP packet; and
setting a TLP semaphore when removing the TLP packet.

* * * * *

UNITED STATES PATENT AND TRADEMARK OFFICE
CERTIFICATE OF CORRECTION

PATENT NO. : 8,166,334 B2
APPLICATION NO. : 12/918050
DATED : April 24, 2012
INVENTOR(S) : Ho M. Lai et al.

It is certified that error appears in the above-identified patent and that said Letters Patent is hereby corrected as shown below:

In the Claims

In column 8, line 50, in Claim 1, delete "coupled an" and insert -- coupled to an --, therefor.

In column 8, line 55, in Claim 2, delete "point" and insert -- point, --, therefor.

In column 9, line 24, in Claim 7, delete "buffet" and insert -- buffer --, therefor.

In column 9, line 56, in Claim 12, delete "elastic" and insert -- elastic buffer --, therefor.

In column 10, line 7, in Claim 14, delete "a the" and insert -- a --, therefor.

In column 10, line 13, in Claim 14, delete "liner" and insert -- linear --, therefor.

In column 10, line 19, in Claim 15, delete "point" and insert -- point, --, therefor.

In column 10, line 21, in Claim 15, delete "as" and insert -- a --, therefor.

In column 10, line 43, in Claim 17, delete "liner" and insert -- linear --, therefor.

In column 10, line 59, in Claim 19, delete "shaving" and insert -- having --, therefor.

In column 10, line 67, in Claim 19, delete "to" and insert -- too --, therefor.

In column 11, line 2, in Claim 19, delete "cloak" and insert -- clock --, therefor.

In column 12, line 1, in Claim 20, delete "17," and insert -- 19, --, therefor.

Signed and Sealed this
Fifteenth Day of October, 2013

Teresa Stanek Rea
*Deputy Director of the United States Patent and Trademark Office*